United States Patent [19]

Blank

[11] Patent Number: 5,345,313
[45] Date of Patent: Sep. 6, 1994

[54] IMAGE EDITING SYSTEM FOR TAKING A BACKGROUND AND INSERTING PART OF AN IMAGE THEREIN

[75] Inventor: Arthur M. Blank, San Diego, Calif.

[73] Assignee: Imageware Software, Inc, San Diego, Calif.

[21] Appl. No.: 844,299

[22] Filed: Feb. 25, 1992

[51] Int. Cl.⁵ .................. H04N 9/74; H04N 5/262
[52] U.S. Cl. ........................... 348/598; 348/584
[58] Field of Search ............... 358/22, 22 CK, 183, 358/182

[56] References Cited

U.S. PATENT DOCUMENTS

| | | |
|---|---|---|
| 4,190,856 | 2/1980 | Ricks . |
| 4,439,783 | 3/1984 | Nishikawa ............................ 358/183 |
| 4,506,289 | 3/1985 | Shirakami ............................ 358/183 |
| 4,694,329 | 9/1987 | Belmares-Serabia et al. ....... 358/183 |
| 4,827,253 | 5/1989 | Maltz . |
| 4,827,344 | 5/1989 | Astle et al. ........................... 358/182 |
| 4,864,410 | 9/1989 | Andrews et al. ..................... 358/22 |
| 4,910,661 | 3/1990 | Barth et al. . |
| 5,117,283 | 5/1992 | Kroos et al. ......................... 358/182 |

FOREIGN PATENT DOCUMENTS 2253490  9/1992  United Kingdom .

OTHER PUBLICATIONS

People Postcards! ®, a brochure 2 pp.

Primary Examiner—Edward L. Coles, Sr.
Assistant Examiner—Kimberly A. Williams
Attorney, Agent, or Firm—Knobbe, Martens, Olson & Bear

[57] ABSTRACT

A system and method for editing digital images includes a processor for storing a digital image of an object and a background. The periphery, or edge, of the object has a first hue, and the background has a second hue. Based upon the difference between the hues and a predetermined hue difference, the processor locates the edge of the object and removes portions of the image (i.e., the background) that are outside the edge. Then, the object can be combined with a preselected background so as to form a composite image. Optionally, the gamma of the image of the preselected background and the gamma of the image of the object can be matched, thereby making the object appear as if it was imaged under the same lighting conditions as the preselected background.

35 Claims, 8 Drawing Sheets

Microfiche Appendix Included
(1 Microfiche, 14 Pages)

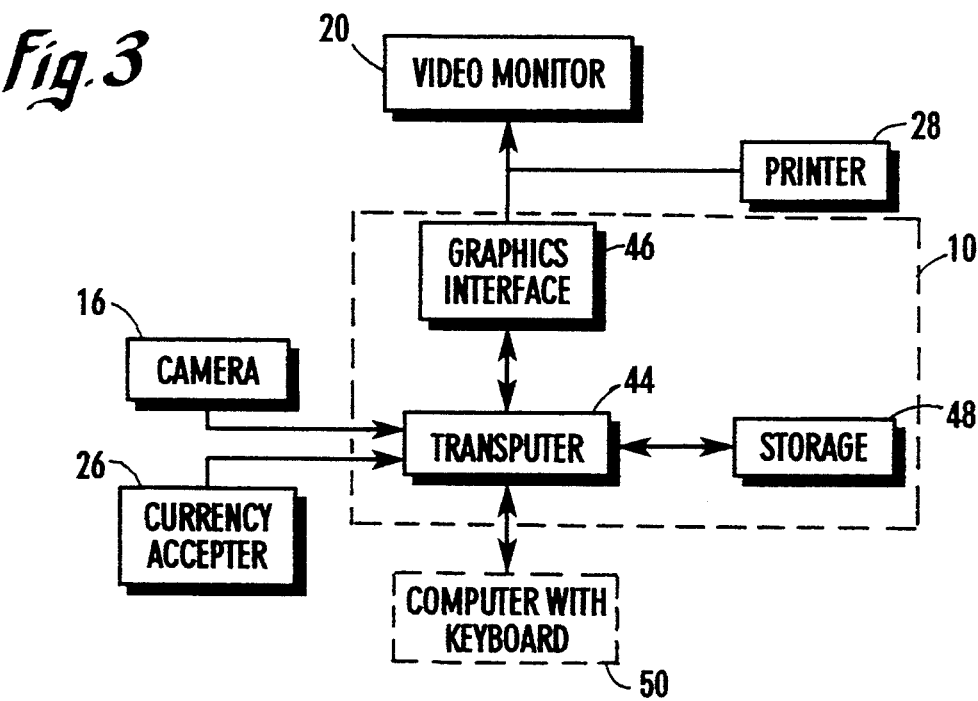
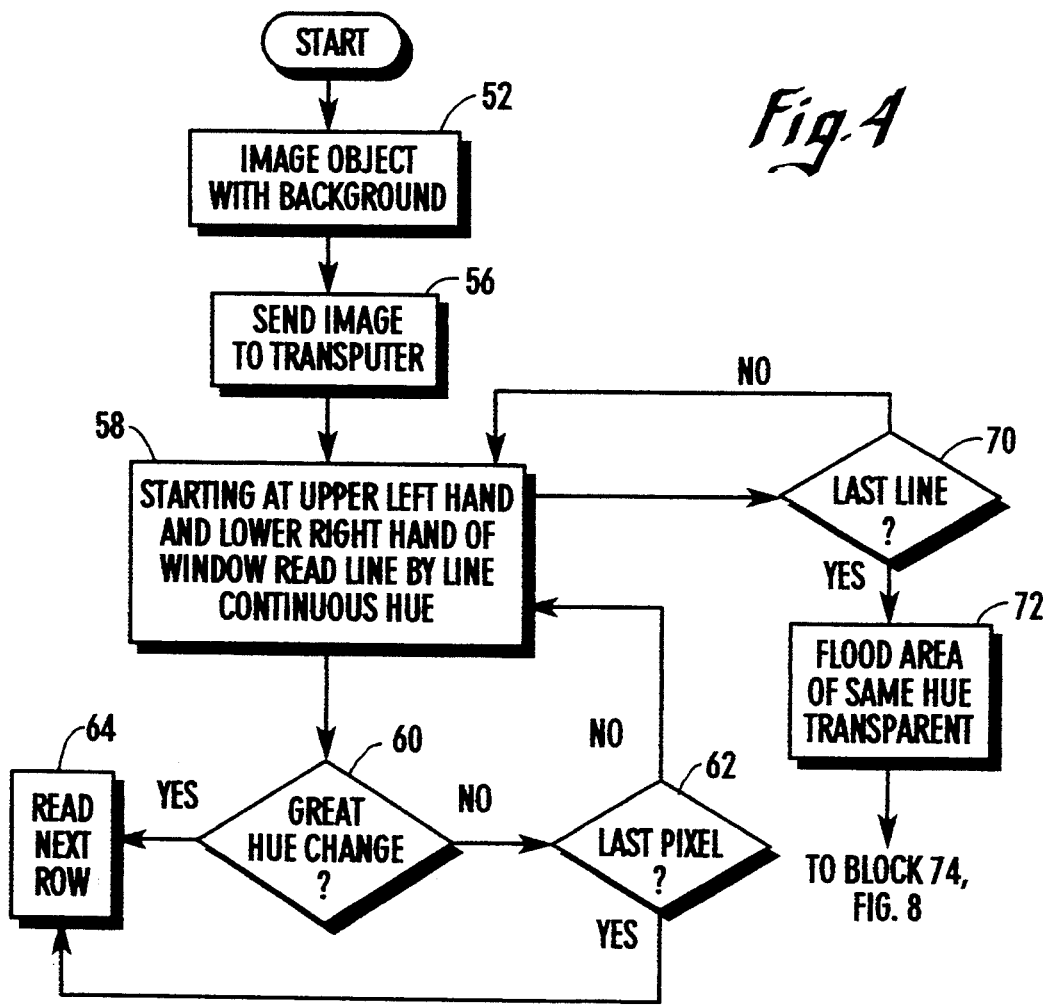

IMAGE EDITING SYSTEM FOR TAKING A BACKGROUND AND INSERTING PART OF AN IMAGE THEREIN

MICROFICHE APPENDIX

A microfiche appendix containing computer source code is attached. The microfiche appendix comprises 1 sheet of microfiche having 14 frames, including one title frame.

The microfiche appendix contains material which is subject to copyright protection. The copyright owner has no objection to the reproduction of such material, as it appears in the files of the Patent and Trademark Office, but otherwise reserves all copyright rights whatsoever.

BACKGROUND OF THE INVENTION

1. Field of the Invention

The present invention relates to image processing and, more particularly, to systems for editing digital images.

2. Background of the Technology

A large number of applications require combining one video image with another video image so as to produce a composite video image. One well-known technique for producing composite video images is commonly referred to as "chroma-key". The chroma-key technique is so named because it uses the chroma portion of a television signal as a "key" to control the formation of a composite image. A chroma-key device is essentially a video multiplexer which selects a video input signal by feeding the chroma signal from one of the two video inputs to decision logic.

As an example application, television stations typically use chroma-key for weather reports. During the weather report, a television camera is directed at a weather reporter standing in front of a vertical sheet, called a matte, which has a predetermined blue hue. The image of the weather reporter and matte, of foreground source, is provided to a chroma-key device, which is programmed to not select video signals that represent portions of the image having the predetermined blue hue. Thus, the chroma-key device effectively separates the image of the reporter from the image of the matte.

At the same time that the previously described operation takes place, a video image of a weather map or satellite view of the earth, either of which may be superimposed with city names, high/low temperatures, and the like, is provided to the chroma-key device as a background source. The decision logic of the chroma key device selects the background source as video output wherever a blue hue is detected in the foreground source. The background source is also displayed on a studio monitor that can be viewed by the reporter. The reporter can then point to positions on the matte that correspond to geographic locations on the background source and the viewer of the television program sees a composite image of a reporter and a weather map.

Such a composite image is the desired output of a chroma-key device.

However, as was noted in U.S. Pat. No. 4,811,084 to Belmares-Sarabia, et al., a major disadvantage of a chroma-key system is that false keys can be produced. For example, weather reporters wearing blue or striped suits, and even blue eyes, may cause a chroma-key system to produce an incorrectly spliced composite. Also, a chroma-key device is used too large a distance between the reporter and the matte causing reflections resulting from false keying, hence restraining the movements of the reporter.

To overcome the problems inherent in chroma-keying, Belmares-Sarabia, et al., discusses a device for video color detection that does not depend on a single color for keying. For example, such a device is also said to discriminate among similar hues by limiting the bandwidth of the hues and/or hue and saturation combinations that can be recognized by the device.

The device disclosed in Belmares-Sarabia, et al., uses an analog process to multiplex television signals. Analog processes, however, are not as versatile in combining images as are digital processes, which can be programmed to apply sophisticated image processing algorithms to a digitized image so as to alter or edit an image. Thus, it would be an advancement in the technology to provide a digital image editing system which can strip a digital image of an object from a background and combine the digital object with a different digital background.

It is often the case that an object is imaged under one lighting condition and is then overlaid on a background that was imaged under another lighting condition. Consequently, the composite image may look artificial. Thus, it would be a further advantage if the editing system could establish the same lighting conditions, or "gamma", for the entire composite image. For example, it may be desirable to have an object that was imaged under fluorescent light inserted into a background that was imaged under full daylight and have the composite image maintain the same lighting condition. The lighting condition of the composite image could even be a third condition such as moonlight.

Accordingly, a need exists to provide a digital image editing system which can separate the digital image of an object from a background against which the object was imaged. It is a further object of the present invention to provide a digital image editing system which can overlay the digital image of an object onto a predetermined background, and then match the gammas of the object and background, and to provide a digital image editing system that is easy to implement and cost-effective to use.

SUMMARY OF THE INVENTION

The present invention satisfies the above-mentioned needs and includes a system and method for selectively combining digital images. The system includes a processor, preferably a transputer, which is connected to a device, such as a video camera, that can generate a signal representing an image. "Transputer" is a registered trademark of InMos Corp. An object, for example, a human, is positioned in front of the video camera, and the video camera generates a signal representing the object and the background that is behind the object.

Accordingly, the signal from the camera includes an object component representative of the image of the object and a background component representative of the image of the background. The object has an edge, and the processor detects the edge of the object and separates portions of the image that are outside the edge of the object (i.e., the background component) from portions of the image that are inside the edge (i.e., the object component).

In one embodiment, the background has a single continuous hue, and based upon the difference in hue between the object and background, the processor determines the location of the edge of the object. Based on this determination, the processor removes the background component from the signal.

More particularly, the video camera produces a digital signal that is comprised of a plurality of pixels that are arranged in rows. Each pixel has a hue gamma and each hue gamma has a corresponding numeric value. The processor determines the location of the edge of the object by first ascertaining the numeric value of the hue gamma of a first pixel that is located at the end of the top row of the video window (i.e., is located at the periphery of the video image). The processor also determines the numeric value of the hue gamma of an adjacent second pixel in the row, and then compares the difference between the gammas to a predetermined difference.

When the difference between the hue gamma of the first pixel and the hue gamma of the second pixel is less than the predetermined difference, the processor compares the hue gamma of the second pixel with the hue gamma of a third pixel that is located in the same row as the first and second pixels and is adjacent to the second pixel, and so on. On the other hand, when the difference between two pixels exceeds the predetermined value, indicating the presence of a portion of the edge of the object, the processor stores the location of the edge portion in memory, and then repeats the process described above for the row immediately below the top row of pixels. If desired, the processor can simultaneously perform a process like the one described above, but working upwardly from the bottom row of pixels.

The processor continues the process, i.e., working inwardly from the boundary of the video window in the pixel-by-pixel comparisons, until the entire edge of the object has been mapped. After mapping the edge of the object, the processor "strips" (i.e., removes) the background component from the object component by setting all background pixels to a preselected transparent value.

In another embodiment, the background has a white substrate with a plurality of boxes printed thereon. Each box contains a plurality of dots, and the processor has a map of the background stored in memory. When the object is positioned in front of the background, the object masks some of the vertices of the boxes and some of the dots within the boxes. Consequently, the processor can determine the position of the object by comparing the digital video signal with the stored map of the background to thereby determine which vertices and dots have been blocked by the object. Once the location of the object has been determined, the processor strips the background image away from the object image.

After stripping away the background image from the object image, the processor can, if desired, integrate the object image into a preselected background image that is different than the background against which the object was imaged. More particularly, the processor can have one or more preselected background images stored in the memory of the processor. The processor can selectively digitally combine the object component of the signal with a second signal which is representative of one of these stored backgrounds, and present the composite image on a video display. Thus, the image of the object can be combined, if desired, with a preselected background that is different from the background against which the object was imaged, and the composite image displayed. This combining of images can be accomplished real-time by an operator, who can view the video display and position and orient the image of the object on the preselected background by means of a mouse, keyboard, or joystick that is operably connected to the editing system.

Stated differently, the processor can essentially function as an image combiner by stripping, from a digital video signal, the image of an object from the image of the background in front of which the object was positioned. The processor then combines the image of the object with a preselected image, and may accomplish the image combining in response to real-time operator-generated signals. Specifically, stored in the memory of the processor is a two-dimensional digital image representation of a three-dimensional field of view. The processor then blends the object into the selected background so that the object appears to be integrated into the three-dimensional field of view.

Preferably, to further blend the object into the preselected image, the processor averages the hue of edge of the object and the hue of the portion of the preselected background that is contiguous to the edge. The processor then adjusts the hue of the edge of the object to equal the averaged hue.

Additionally, the processor of the present invention can adjust the gamma of one or both of the object and the preselected stored background, to make the integrated image appear as if the object was imaged under the same lighting conditions as the preselected stored background. For example, the processor can ascertain the gamma of the preselected background, and then adjust the numeric value of the hue of the pixels that make up the image of the object as appropriate to make the object appear as though it was imaged under the same lighting conditions under which the preselected background was imaged.

The system of the present invention can also include a video printer electrically connected to the processor for generating a picture of the object. Also, the system can include a currency acceptor which is operably engaged with the processor for accepting currency and activating the system in response to the insertion of currency into the acceptor. Thus, the system can, in one application, be used in conjunction with electrical imaging booths that are installed in public places for use by the public.

In addition to the system described above, a method is also disclosed for video editing, i.e., for integrating the image of an object, e.g., a person, into a preselected two-dimensional representation of a three-dimensional space. In accordance with the method of the present invention, a first digital image that includes an object having a first hue and a background having a second hue has an edge defined by the difference in hue between the object and the background. This edge is detected, and the portion of the image outside the edge (i.e., the background) is removed from the image. The object is then overlayed on a preselected background, to produce an integrated image of the object and preselected background.

These and other objects and features of the present invention will become more fully apparent from the following description and appended claims taken in conjunction with the accompanying drawings, in which like numerals refer to like parts.

BRIEF DESCRIPTION OF THE DRAWINGS

FIG. 3 is a block diagram showing the components of the imaging system of FIGS. 1 and 2;

FIG. 4 is a top-level flow diagram for the imaging system, when used in conjunction with the monochrome background of FIG. 1;

DETAILED DESCRIPTION OF THE PREFERRED EMBODIMENT

Figure 1:
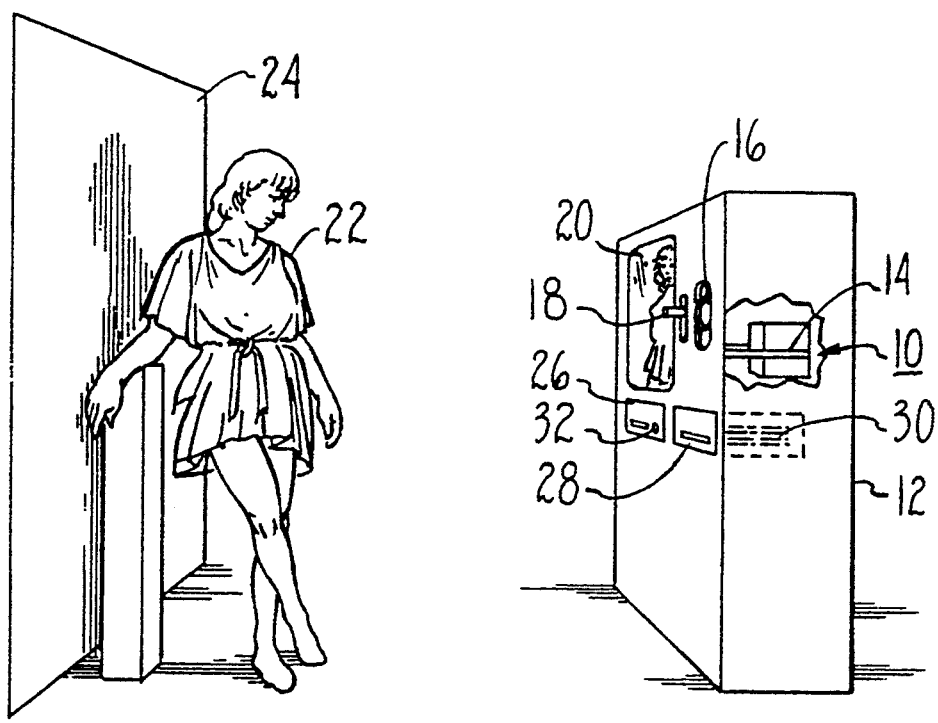
FIG. 1 is a perspective view of a presently preferred apparatus imaging system, with portions cut away and shown in phantom, of the present invention, and a human object standing in front of a background of a single hue.

Referring initially to FIG. 1, a presently preferred embodiment of a digital image editing system of the present invention is generally indicated at 10. It is to be understood that the imaging system 10 can be used in virtually any application where it is desirable to separate of an object from a background in a digital image, and then combine the object with a different background to form a composite image.

One such application is shown in FIG. 1, which shows that the system 10 can be mounted by brackets 14 within an automated postcard system 12. Certain features of the apparatus 12 are described in a co-pending United States patent application identified by Ser. No. 669,664, and assigned to the same assignee as the present application. The apparatus 12 includes a video camera 16, such as a model VKC-360 camera manufactured by Hitachi Corp., and the camera 16 is movably mounted on the apparatus 12 and is electrically connected to the system 10. Also, the apparatus 12 includes a handle 18 that is connected to the camera 16 for the purpose of manually orienting the camera 16 in the apparatus 12.

Still referring to FIG. 1, a video monitor 20, such as a standard RGB/CGA display, is mounted in the apparatus 12 and the monitor 20 is electrically connected to the system 10 for displaying a video image, such as the image of a model 22. As shown, the model 22 in FIG. 1 is standing in front of a monochrome background 24, which can be any desired color.

As shown in FIG. 1, the apparatus 12 also includes a currency-receiving device 26, such as a model OB-A4 device made by Rowe. Further, the apparatus 12 includes a printer 28 which is filled with blank sheets of postcard stock 30. Upon payment of an appropriate amount of currency in the device 26, the image of the model 22 can be printed on one of the sheets 30 and dispensed. In one presently preferred embodiment, the printer 28 is a model SV6510 color printer made by Kodak.

Moreover, one or more controls 32 are mounted on the apparatus 12 and are connected to the system 10. The control 32 shown in FIG. 1 is a button that provides a means whereby the model 22 can manually position and orient her image onto the image of one of a plurality of preselected backgrounds which is electronically stored in the system 10.

Figure 2:
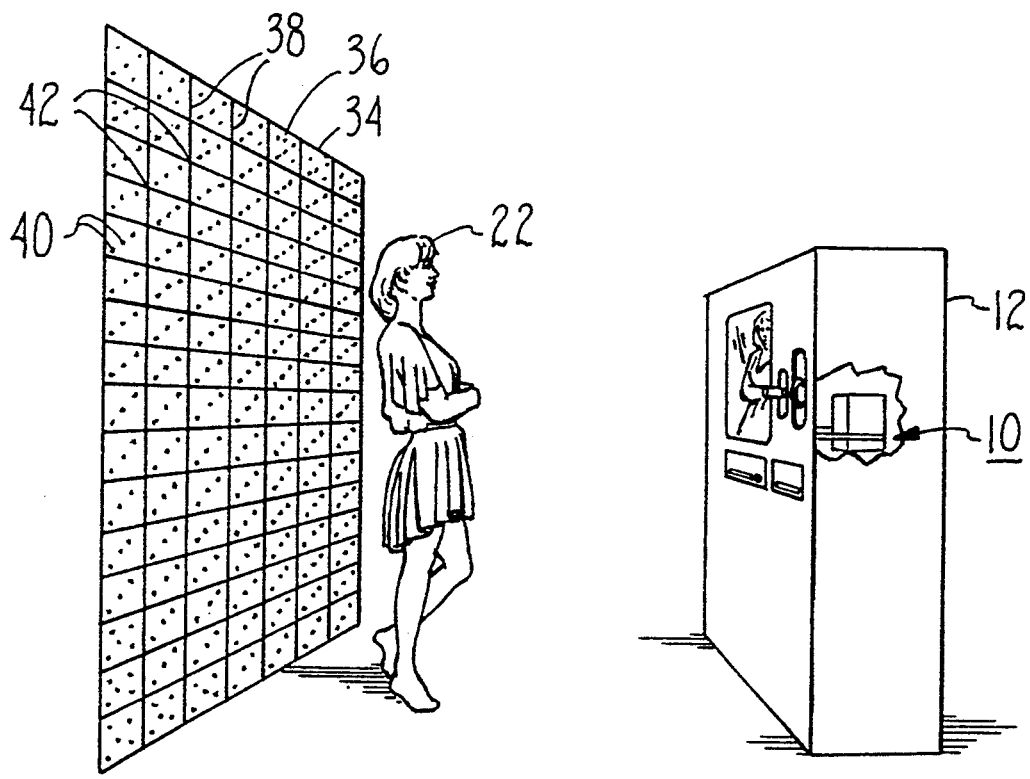
FIG. 2 is a perspective view of a coin-operated electronic imaging apparatus which embodies the system of the present invention, and which has a checkerboard background, with portions broken away for clarity.
Figure 5A:
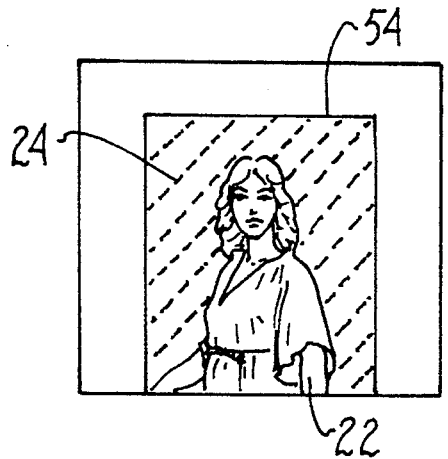
FIG. 5 is a sequence of images, labeled I, II, III IV and V, which have been processed by the imaging system according to the steps shown in FIG. 4.
Figure 5B:
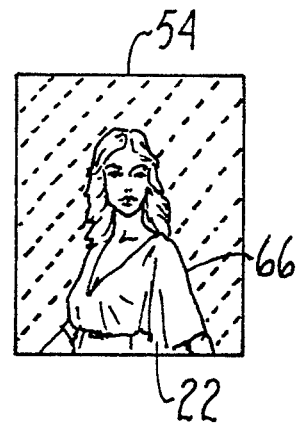
Figure 5C:
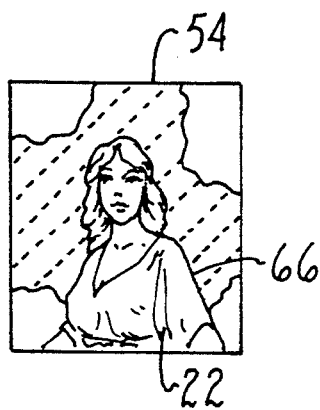
Figure 5D:
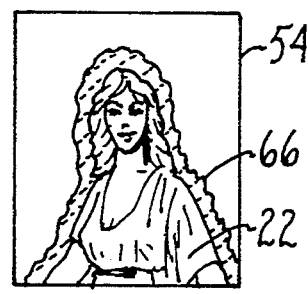
Figure 5E:
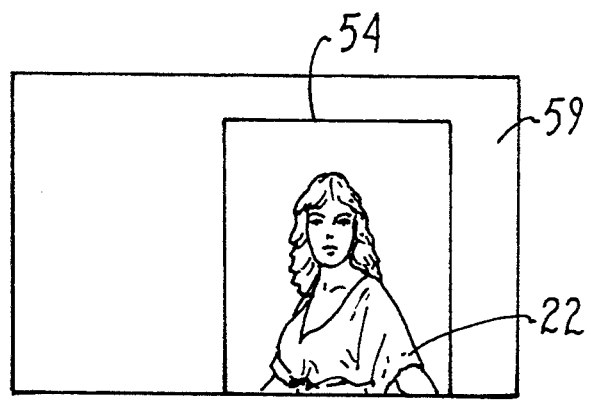

FIG. 2 shows that the system 10 can be used in conjunction with a background which is not monochrome. More particularly, as shown in FIG. 2, the system 10 can be used with a background 34 which comprises a monochrome (e.g., white) substrate 36. A plurality of black boxes 38 are printed on the substrate 36 and, inside each square, a plurality of black dots 40 are printed on the substrate 36 in a predetermined pattern. As shown, the boxes 36 establish a plurality of vertices 42. In one presently preferred embodiment, each box 36 has a side length of about 2 inches, and each dot 40 has a diameter of about 0.025 inches. Thus, the background 34 has a predetermined pattern, and the pattern is electronically stored in the system 10. This background 34 is also prestored in the system 10.

Referring now to FIG. 3, the system 10 is shown to comprise various electronic components. As indicated in FIG. 3, the system 10 includes a digital processor, preferably a transputer 44, such as model ATW 800 available from perihelion of England, in the United Kingdom. As shown, the transputer 44 is electrically connected to the video camera 16 and currency acceptor 26 for receiving input signals therefrom. Also, the transputer 44 is electrically connected to a suitable graphics interface driver 46, and the graphics driver 46 in turn is electrically connected to the video monitor 20. Also, the graphics driver 46 is electrically connected to the printer 28.

FIG. 3 also shows that if desired, an electronic storage device 48, such as a hard disk drive, can be connected to the transputer 44. Additionally, a computer with keyboard 50 is optionally electrically connected to the transputer 44 so that the model 22 (shown in FIG. 1), or other operator, can control certain functions of the transputer 44, as discussed more fully below.

Now referring to FIGS. 1, 4, and 5, the operation of the system 10 will be described. Initially, the system 10 receives a video signal from a suitable source such as the video camera 16. As indicated at block 52 in FIG. 4 and shown schematically at Roman numeral I in FIG. 5, this signal is representative of an object, e.g., the model 22, and a background against which the object was imaged, e.g., the continuous hue background 24. As shown in Roman numeral I of FIG. 5, only a portion 54 of the camera view is digitized for processing by the transputer 44. Ordinarily, the signal from the camera 16 is an analog signal, and is digitized into a two-dimensional matrix of pixels (represented in Roman numeral II in FIG. 5) by a video frame grabber such as graphics daughterboard available from perihelion of the United Kingdom, which is included in the transputer 44. In the presently preferred embodiment, the matrix of pixels or image is 640×480, although other matrix sizes can be used.

In the specific embodiment shown in FIG. 1, the system 10 can be activated to generate a video signal representative of the image of the model 22 and background 24 by inserting the proper amount of currency into the currency acceptor 26. Specifically, the currency acceptor 26 sends a signal to the transputer 44, and the transputer 44 in turn activates the camera 16. Alternatively, in embodiments which include a control computer 50, the currency acceptor 26 can send a signal to the computer 50 for activating the system 10.

In any case, once the video signal has been generated by the video camera 16 and digitized into pixels, the digital image 54 is stored in a memory (not shown) in the transputer 44, as indicated at block 56 in FIG. 4. Block 58 indicates that the transputer 44 selects the upper left and lower right pixels of the video image 54. It is to be understood, however, that the principles of the process described below, which is executed by the transputer 44, can be applied when selecting only a single pixel as a starting point or when selecting more than two pixels as simultaneous starting points. For example, as shown at Roman numeral III in FIG. 5, the transputer 44 could execute the process described below starting at all four corners of the image 54 simultaneously. The process described below can be coded in any suitable computer language, e.g. C.

Accordingly, for disclosure purposes, the process below will be described with reference to use of the upper left pixel of the digitized video image 54 as the starting point. It will be appreciated that the principles of the process will be substantially identical for other starting points, e.g., the lower right pixel of the video image 54, including instances wherein the transputer 44 starts at two or more points simultaneously. The control of the parallel processing for multiple processing regions is known to those skilled in the technology.

Block 58 indicates that the transputer 44 compares the gamma of the upper left pixel with the gamma of the next pixel in the top row of the video image 54. As is used in the technology, the gamma of a particular pixel is a numeric value that refers to one or more of the particular data attributes which characterize the pixel. For example, some video image pixels have attributes that relate to the hue, intensity, luminescence, saturation, and contrast of the portion of the image represented by the pixel. Accordingly, such pixels will have respective numeric "gammas" that represent each one of the above-listed attributes of the particular pixel.

For purposes of the present invention, the gammas that are compared between pixels are the hue gammas of the pixels, although other gammas may be used. In the present embodiment, the hue gamma of each pixel is an integer value from one (1) to two hundred fifty five (255), with the hue gamma value indicating the hue of the portion of the image represented by the pixel. In the event that the video image is in black-and-white, the hue gamma of a pixel will represent the shade of gray of the pixel, or a gray scale valve.

It will accordingly be appreciated that in the case of the continuous hue background 24, adjacent background pixels will have substantially identical hue gamma values, with the particular value depending on the color of the background 24. For example, if the background was defined as 255, e.g., saturated blue, then the background pixels would typically not deviate more than 20 to 40. Thus, the transputer 44 assumes that the upper left pixel of the video image 54 is a background pixel, and uses this pixel as a standard pixel. The transputer 44 compares its hue gamma with the hue gamma of the immediately adjacent pixel (which can accordingly be considered the test pixel) that is in the same row as the upper left pixel, to determine whether the immediately adjacent pixel (i.e., test pixel) is also a background pixel. This step is represented at decision block 60 in FIG. 4.

More specifically, as indicated at decision block 60, the transputer 44 compares the difference between the hue gammas of the upper left corner pixel (i.e., the standard pixel) and the immediately adjacent pixel (i.e., the test pixel) with a predetermined difference. When the predetermined difference is greater than the difference between the hue gammas of the two pixels, indicating that the test pixel has approximately the same hue as the standard pixel and is therefore a background pixel, the transputer 44 proceeds from block 60 to decision block 62 in FIG. 4 to determine whether the test pixel is the last pixel in the row. If there are more pixels in the row, the transputer 44 loops back to block 58, wherein the transputer 44 sets the new standard pixel to be the old test pixel, and selects the next pixel in the row as the new test pixel. The transputer 44 then continue to block 60 to determine the difference between the hue gamma of the standard pixel and the hue gamma of the test pixel, as described above, and compares this difference to the predetermined difference at decision block 60.

On the other hand, when the transputer 44 determines that the test pixel is the last pixel in the row at decision block 62, the transputer 44 proceeds to block 64, wherein the transputer 44 sets the standard pixel to be the last pixel in the row and the test pixel to be the first pixel in the next immediately lower row. The transputer 44 then resumes the gamma test comparison described above. Thus, the transputer 44 reads and tests the pixels of the background component of the video image 54 in a pixel-by-pixel, row-by-row sequence.

When the transputer 44 determines, at decision block 60, that the difference between the standard pixel and the pixel under test exceeds the predetermined difference, indicating that the test pixel is not a background pixel and is therefore representative of an edge 66 of the image of the model 22 (FIG. 5, Roman numeral III) which has been imaged against the monochrome background 24 (FIG. 1), the transputer 44 stores the location of the test pixel in memory. Stated differently, the transputer 44 maps the test pixel as a portion of the edge 66. As indicated in FIG. 4, the transputer 44 then proceeds to block 64 and resumes processing as described above.

The transputer 44 follows the process described above, working simultaneously from the upper left and lower right hand corner pixels, until the transputer 44 determines that no more pixels remain to be tested, as indicated by a positive test at decision block 70. At the point wherein no more pixels remain to be tested, the transputer 44 moves to block 72, wherein the transputer 44 "floods" the background (i.e., turns all pixels that were outside the edge 66 transparent) by setting the hue gamma of the background pixels to one (1). Alternatively, each background pixel can be turned transparent as soon as the transputer 44 determines that the particular pixel is indeed a background pixel. At this point in the process, the digitized video image 54 appears as schematically shown at Roman numeral IV in FIG. 5.

Thus, the transputer 44 effectively removes substantially only the portion of the video image 54 that is outside the edge 66 (i.e., the background component of the image), and leaves intact the entire portion of the image 54 that is inside the edge 66 (i.e., the object component of the image). Consequently, portions of the image 54 inside the edge 66 can have the identical hue as the background 24, without being removed from the image 54. Further, no particular, predetermined hue is required to be used as the background hue, in contrast to chromakeying technology. Instead, any hue may be used as the background hue.

From the disclosure above, it will be appreciated that the predetermined hue gamma difference is selected to be sufficiently large to avoid edge mapping due to a background test pixel that has a hue gamma which is marginally offset from the hue gamma of the standard pixel. On the other hand, the predetermined hue gamma difference is selected to be sufficiently small to accurately detect the presence of an object edge pixel, even when the edge pixel has a hue gamma value that is relatively close to the value of the background hue gamma. The precise value of the predetermined hue gamma difference can vary from application to application, depending upon lighting conditions, location, subject matter, etc. In one presently preferred embodiment, the predetermined hue gamma difference is 20.

Roman numeral IV of FIG. 5 shows that after the background component of the digital image 54 has effectively been removed, the component representing the image of the model 22 remains, and has a relatively "fuzzy" edge 66, characterized by a pixel width of about 1 pixel.

Figure 8:
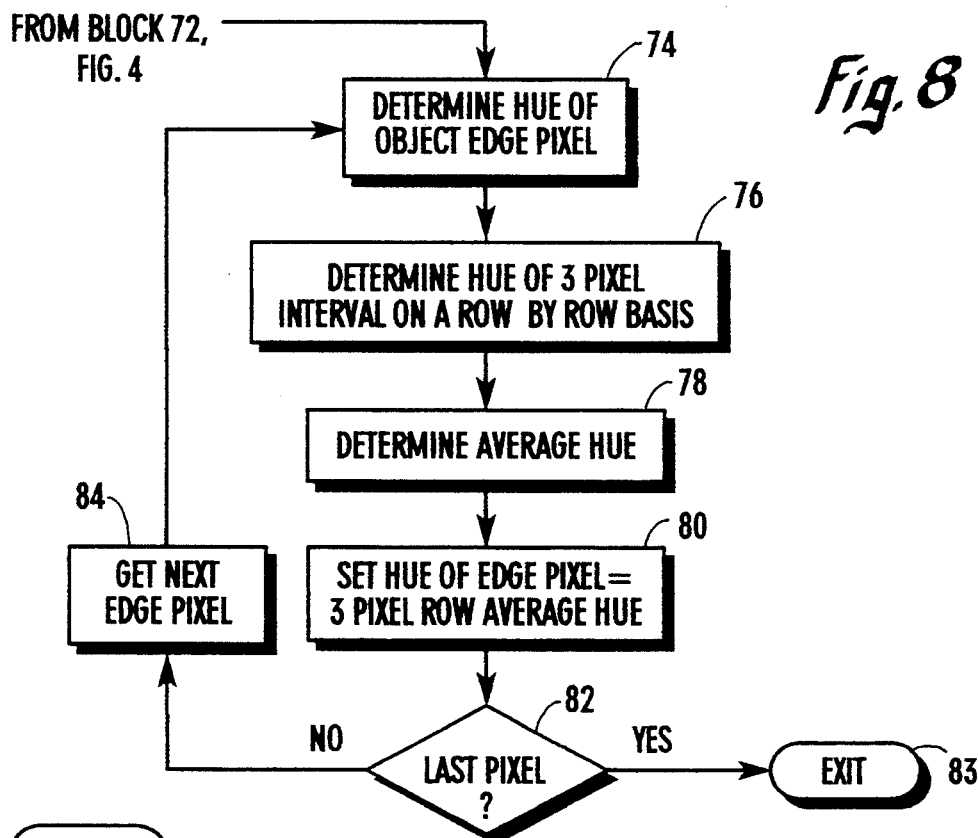
FIG. 8 is a flow diagram of the function for fuzzing the edge of an object of the control flow, shown in FIG. 6.

Accordingly, to produce a digital image having a smooth edge as shown in the diagram labelled Roman numeral V in FIG. 5, the digital transputer 44 next proceeds to the fuzzing function shown in FIG. 8. As indicated at block 74 in FIG. 8, the transputer 44 selects one of the edge pixels (i.e., a "test" pixel) by using software determined address (e.g., by selecting the uppermost left pixel) and determines its hue. Next, as indicated at block 76, the transputer 44 selects the edge pixels which are immediately adjacent the test pixel.

Then, as indicated at block 78, the transputer 44 determines the average hue gamma value of the three pixels. As indicated at block 80, the transputer 44 then sets the hue gamma value of the test pixel to be equal to the average value calculated in block 78. The transputer 44 proceeds to decision block 82, wherein the transputer 44 determines whether the test pixel is the last edge pixel to have been processed in the fuzzing function of FIG. 8. If not, the transputer 44 proceeds to block 84, wherein the transputer 44 selects one of the edge pixels that is immediately adjacent the test pixel, designates this adjacent pixel as the new test pixel, and loops back to block 74. If, at block 82, the transputer 44 determined that the test pixel was the last edge pixel, the transputer 44 exits the fuzzing function.

Upon completion of the fuzzing subroutine, the image appears as indicated at Roman numeral V in FIG. 5. After exiting the fuzzing function shown in FIG. 8, the transputer 44 stores the image of the model 22, and can cause the image of the model 22 to be superimposed on a preselected background image 59. This superimposition is described more fully with reference to FIGS. 2, 6, and 7 below.

Figure 6:
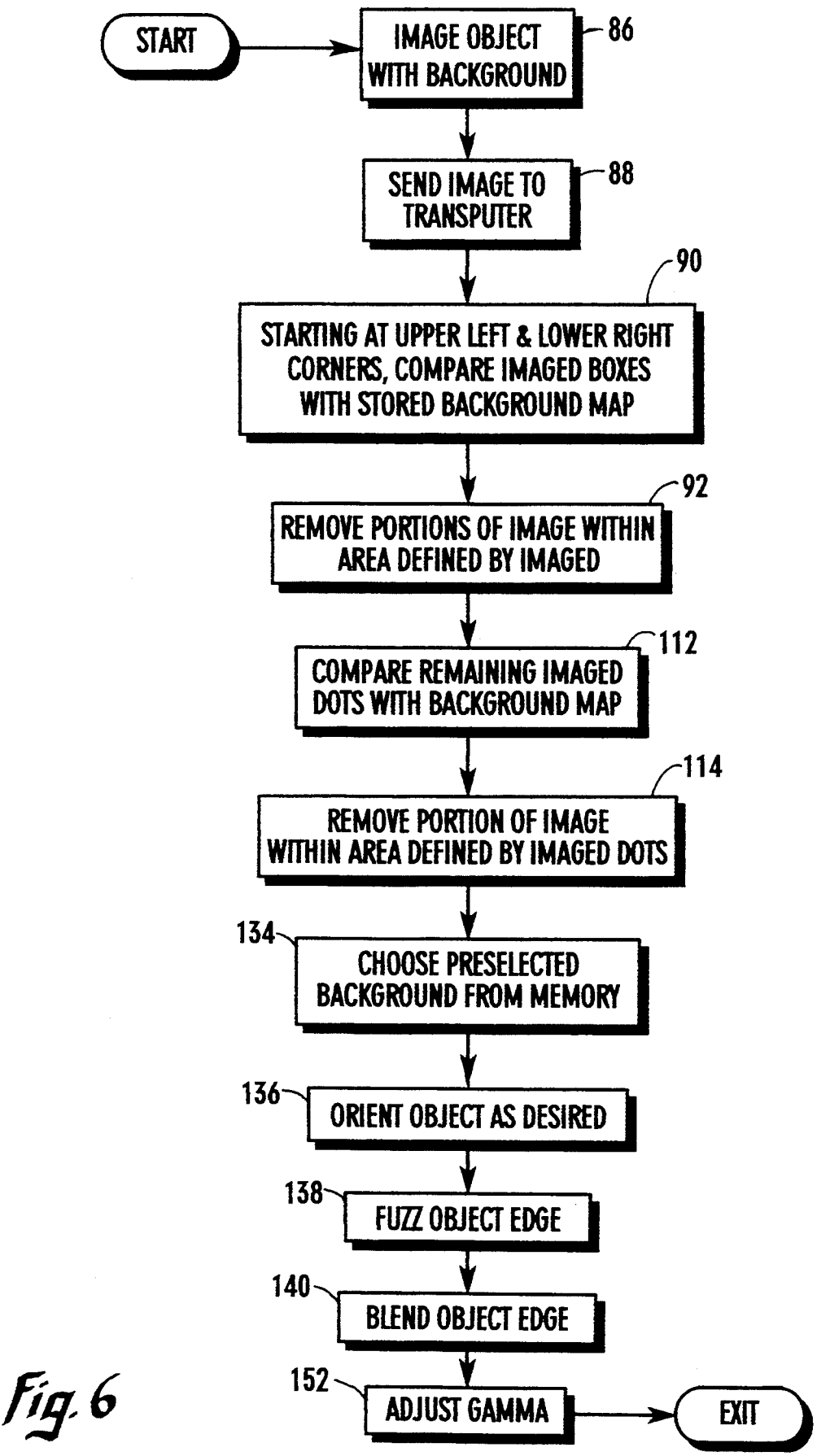
FIG. 6 is a block diagram showing the overall processing steps of the system of the present invention, when the checkerboard background shown in FIG. 2 is used.
Figure 7A:
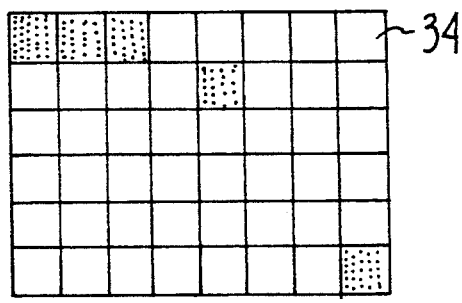
FIG. 7a–7d is a schematic diagram graphically showing a video image in its various phases during the process shown in FIG. 6.
Figure 7B:
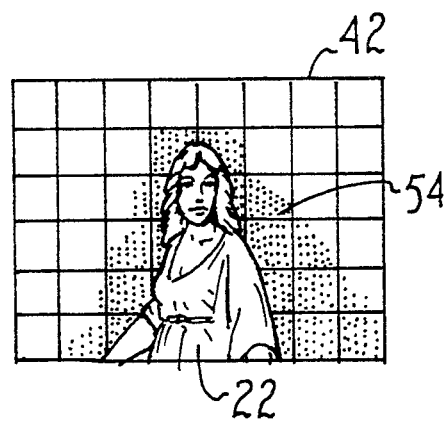
Figure 7C:
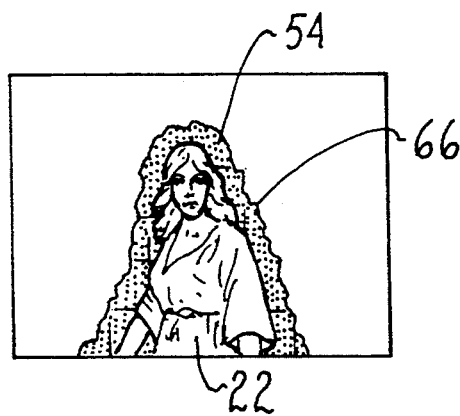
Figure 7D:
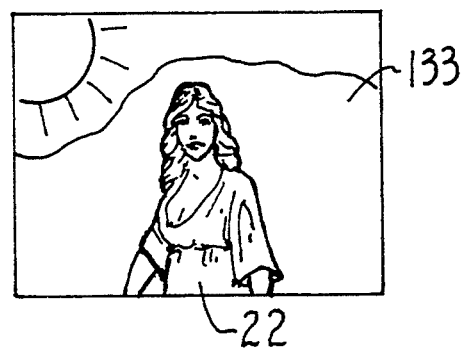

Referring now to FIGS. 2, 6, and 7, the operation of the system 10 when a checkerboard background 34 is used can be appreciated. The operation of the transputer 44 at blocks 86 and 88 in FIG. 8 is essentially as described for the operation of the transputer 44 at blocks 52 and 56 in FIG. 4.

From block 88, the transputer 44 proceeds to block 90. At block 90, the transputer 44, starting simultaneously at the upper left and lower right hand corner pixels of the digitized video image, performs a "coarse background strip". Specifically, the transputer 44 compares the vertices 42 of the stored image 54 with a stored map of the background 34 shown in FIG. 2 and indicated at Roman numeral I in FIG. 7. This stored background map is a map of the boxes 38 and dots 40 of the background 34 in x,y, Cartesian coordinates. In other words, at block 90, the transputer 44 determines which portions of the image 54 contain boxes 38, and saves this portion as background.

From block 90, the transputer 44 moves to block 92, wherein the transputer 44 removes portions of the image 54 which match the background map stored in memory, based upon the comparison in block 90. Specifically, at block 92, the transputer 44 removes those portions of the image 54 which form the edges of complete (i.e., four-sided) boxes 38. Also, the transputer 44 removes those portions of the image 54 that are within complete imaged boxes 38 (i.e., portions of the image of the white substrate 36 that are within imaged boxes 38).

Figure 9:
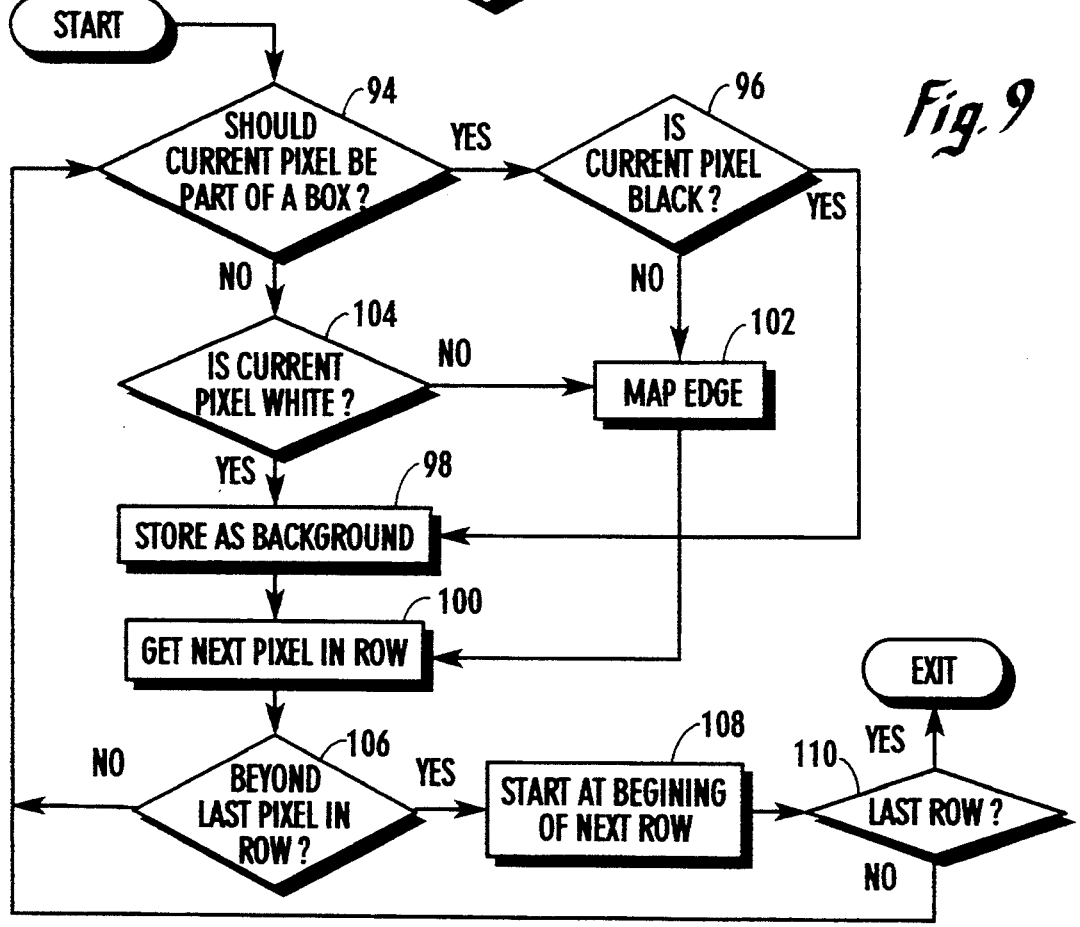
FIG. 9 is a flow diagram of the [top-level?] function for removing portions of the checkerboard background of the control flow of FIG. 6.

The specific coarse stripping operation of the transputer 44 in block 90 can be better seen with reference to FIG. 9. Specifically, as indicated in decision block 94 in FIG. 9, the transputer 44 determines whether the current pixel, i.e., the test pixel, should be part of the edge of a box 38. As described previously, the transputer 44 initially selects the upper left and lower right pixels as the test pixels. After performing the coarse strip test described below on, for example, the upper left hand pixel, the transputer 44 selects either the next pixel in the top row, if an edge was not detected, or the leftmost pixel in the next lower row, if an edge was detected, using the coarse strip function described below. When proceeding from the lower right pixel, the skilled artisan will appreciate that the sequence of selecting test pixels is a mirror image of that described for the upper left pixel sequence. More specifically, after the lower right pixel has been tested, the transputer 44 selects either the next pixel in the bottom row, if an edge was not detected, or the right-most pixel in the next higher row, if an edge was detected.

At block 94, the transputer 44 compares, with the test pixel, the portion of the stored background map that correlates to the test pixel, in x-y Cartesian coordinates. If this comparison indicates that the test pixel should be the same color as a box edge (i.e., that the test pixel should be part of a box), the transputer 44 proceeds to decision block 96.

At decision block 96, the transputer 44 determines whether the current pixel of the image 54 is the same color as the edges of the boxes 38, i.e., black. If so, the transputer 44 proceeds to block 98 to store the current test pixel as a background pixel. From block 98, the transputer 44 proceeds to block 100, wherein the transputer 44 selects the next pixel in the row of the current test pixel.

If the transputer 44 in decision block 96 determines that the test pixel is not black, the transputer 44 proceeds to block 102, wherein the transputer 44 maps the test pixel as an edge pixel, i.e., identifies the test pixel as being part of the edge 66 of the object 22 of the digitized image 54. From block 102, the transputer 44 proceeds to block 100, and the next pixel is chosen as described above.

If, at decision block 94 of FIG. 9, the transputer 44 determines that the current pixel should not be part of a box 38, the transputer 44 proceeds to decision block 104. At decision block 104, the transputer 44 determines whether the test pixel is white, i.e., whether the test pixel is part of the white portion 36 of the background 34. If not, the transputer 44 proceeds to block 102 and operates as described above. Otherwise, from block 104, the transputer 44 proceeds to block 98.

At this point in the process, the test pixel has either been recorded as a background 34 pixel or an object 22 pixel. From block 100, the transputer 44 proceeds to decision block 106, wherein the transputer 44 determines whether the test pixel is the last pixel in the row. If so, the transputer 44 proceeds to block 108, wherein the transputer 44 selects the first pixel (i.e., left-most pixel in for processes that started from the upper left corner and right-most pixel for processes that started at the lower right corner of the digitized image) pixel in the row immediately following the row that had been under test. Otherwise, the transputer 44 loops back to decision block 94 to process the new test pixel.

From block 108, the transputer 44 proceeds to decision block 110, wherein the transputer 44 determines whether the row which had been under test was the last row. Stated differently, at decision block 110 the transputer 44 determines whether the row which had been under test is the bottom row of the digitized image, if the particular process is that portion of the processing that started at the upper left corner pixel of the digitized image. If, on the other hand, the particular process is that portion of the processing that started at the lower right corner pixel of the digitized image, the transputer 44 determines whether the row that had been under test is the top row in the digitized image.

If the row of the current pixel is not the last row, the transputer 44 loops back to decision block 94. On the other hand, if the transputer 44, at decision block 110, determines that it has tested the last pixel in the last row, the transputer 44 exits the coarse background stripping function shown in FIG. 9 and returns to block 92 in FIG. 6.

Referring back to FIG. 6, in contrast to the coarse background stripping subroutine described above, the process undertaken by the transputer 44 at blocks 112, 114 can be thought of as a refined background stripping function. The image remaining after the transputer 44 has performed the coarse background stripping defined in blocks 90, 92 is depicted in Roman numeral III of FIG. 7, wherein only a small portion of the background 34 (i.e., that portion not within the images of complete boxes 38) remains surrounding image of the model 22. The small remaining portion of the background 34 is removed by the processes undertaken in blocks 112 and 114, wherein the remaining background image dots are compared with the background map and removed from the digital image by the transputer 44.

Figure 10:
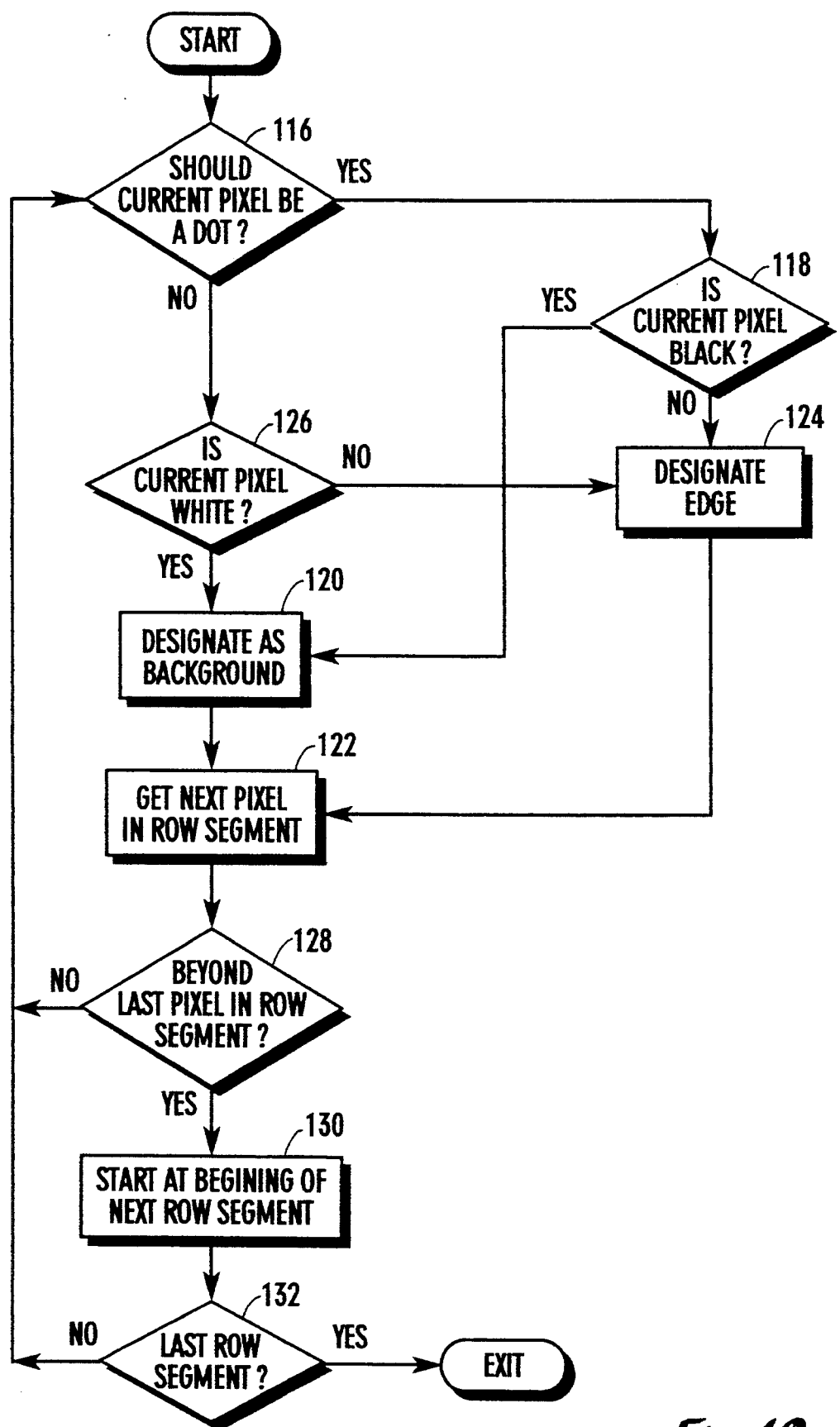
FIG. 10 is a flow diagram of the [low-level?] function for removing portions of the checkerboard background of the control flow of FIG. 6.

The refined background stripping function of block 112 is more fully understood in reference to FIG. 10. Starting at decision block 116 of FIG. 10, the transputer 44 determines whether the current pixel should be a dot. It is to be understood that in selecting the current pixel, the transputer 44 undertakes a selection routine analogous to the routine described in the case of the coarse strip function. Specifically, the transputer 44 starts at the upper left and lower right pixels of the remaining image 54, and sequentially performs the test described below on a pixel-by-pixel, row-by-row basis.

Preferably, but not required, each dot 40 consumes a single pixel in the digitized video image. To determine whether the current pixel should be a dot 40, the transputer 44 accesses the portion of the stored background map in its memory that corresponds to the position occupied by the current, i.e., test, pixel, to determine whether, based on the stored background map, the test pixel should be a dot. If the test pixel should be a dot according to the stored background map, the transputer 44 proceeds to decision block 118, wherein the transputer 44 determines whether the test pixel is black.

If the test pixel is black or other hue determined by software, transputer 44 proceeds to block 120 and designates the test pixel as a background pixel to be removed later. From block 120, the transputer 44 proceeds to block 122, wherein the transputer 44 selects the next pixel in the row, i.e., the pixel that is immediately adjacent to the test pixel.

If, on the other hand, the transputer 44 determines at decision block 118 that the test pixel is not black, the transputer 44 proceeds to block 124 and designates the test pixel as an object edge pixel. From block 124 the transputer 44 proceeds to block 122 and selects the next pixel.

If the transputer 44 at block 116 determines that the current pixel should not be a dot, the transputer 44 proceeds to decision block 126, wherein the transputer 44 determines whether the test pixel is white. If not, the transputer 44 proceeds to block 124 to map the pixel as a test pixel. Otherwise, the transputer 44 proceeds to block 120 and proceeds as previously discussed to block 122.

From block 122, the transputer 44 proceeds to decision block 128, wherein the transputer 44 determines whether the new test pixel is beyond the last pixel in the row of the remaining digitized image. If the test pixel is not the last pixel in the row, the transputer 44 loops back to decision block 116. Otherwise, the transputer 44 proceeds to block 130 wherein the transputer 44 moves to the next row in the remaining digitized image and selects the first pixel in that row.

From block 130, the transputer 44 proceeds to decision block 132 to determine whether the test pixel is the last pixel in the last row of the remaining digitized image. If not, the transputer 44 moves back to decision block 116. Otherwise, the transputer 44 exits the function of FIG. 10 and returns to block 114 in FIG. 6.

At block 114, the transputer 44 removes portions of the image 54 which are represented by pixels that were designated as background pixels in block 112. After the remaining background has been removed, the image 54 appears as shown in the diagram designated by Roman numeral III in FIG. 7.

The transputer 44 proceeds to block 134 in FIG. 6, wherein a background 133 against which the operator (e.g., the model 22) of the system 10 desires to place the image of the object can be selected from the memory of the transputer 44 or the computer 50 as appropriate. This background selection can be made by appropriately operating the control 32 so that the operator can interactively choose the background against which he wants the image to be positioned, or the background can be selected automatically by the transputer 44.

From block 134, the transputer 44 proceeds to block 136 in FIG. 6 wherein the operator of the system 10 can orient the object as desired on the chosen background by viewing the composite image on the monitor 20 and appropriately manipulating the control 32 (FIG. 1). The operator can also position the object as desired on the background, i.e., can superimpose the object on any portion of the background he desires. This orientation can be accomplished by controls (not shown) or can be accomplished automatically by the transputer 44.

Referring again to FIG. 6, the transputer 44 proceeds to block 138 wherein the transputer 44 fuzzes the edges of the object as described with respect to FIG. 8. From block 138, the transputer 44 proceeds to block 140. At block 140, the transputer 44 blends the edges of the object 22 with the surrounding background to sharpen the edge of the object as shown schematically at Roman numeral IV in FIG. 7.

Figure 11:
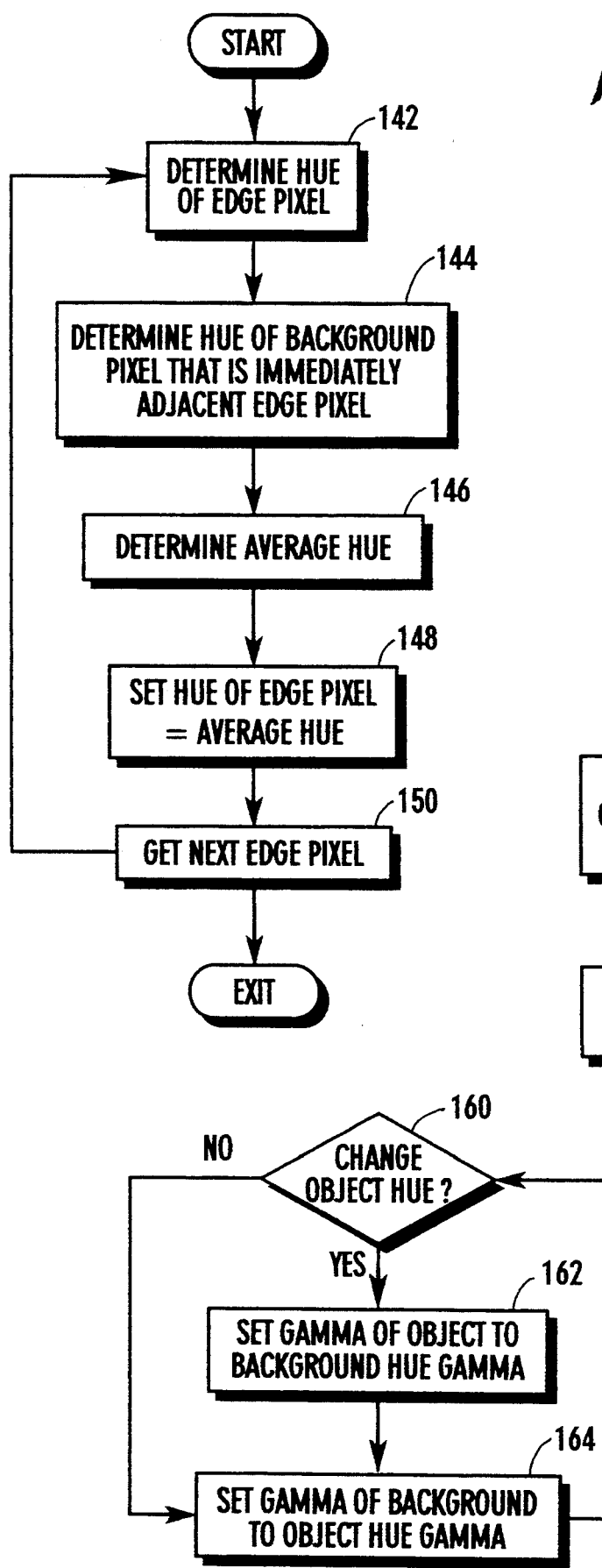
FIG. 11 is a flow diagram of the function for blending the edge of the object of the control flow of FIG. 6.

The blending function 140 is more fully understood by reference to FIG. 11. The transputer 44 begins at block 142 in FIG. 11 wherein the transputer 44 selects an object edge pixel and determines the hue gamma value of the edge pixel. The selection of the object edge pixel can be made at a software determined address, e.g., the upper left edge pixel. From block 142, the transputer 44 proceeds to block 144 and determines the hue of the background pixel that is immediately adjacent to and below the selected edge pixel in the same row as the edge pixel. Then the transputer 44 proceeds to block 146 wherein the transputer 44 determines the average hue of the two pixels. From block 146, the transputer 44 proceeds to block 148, wherein the transputer 44 sets the hue of the edge pixel to equal the average hue that was determined in block 146.

From block 148, the transputer 44 proceeds to block 150, wherein the transputer 44 selects the edge pixel that is immediately adjacent to the pixel whose hue has just been set at block 148, and loops back to block 142. If the pixel under test was the last edge pixel to be blended with the background, the transputer 44 exits the function shown in FIG. 11 and proceeds to block 152 in FIG. 6.

At block 152 of FIG. 6, the transputer 44 varies the hue gamma value of selected portions of the object of the video image with the hue gamma value of selected portions of the background in the composite video image to make it appear as though the object were imaged under the same lighting condition as the background against which the object has been digitally superimposed. The details of the process carried out by the transputer 44 at block 152 is more fully understood in reference to FIG. 12.

Figure 12:
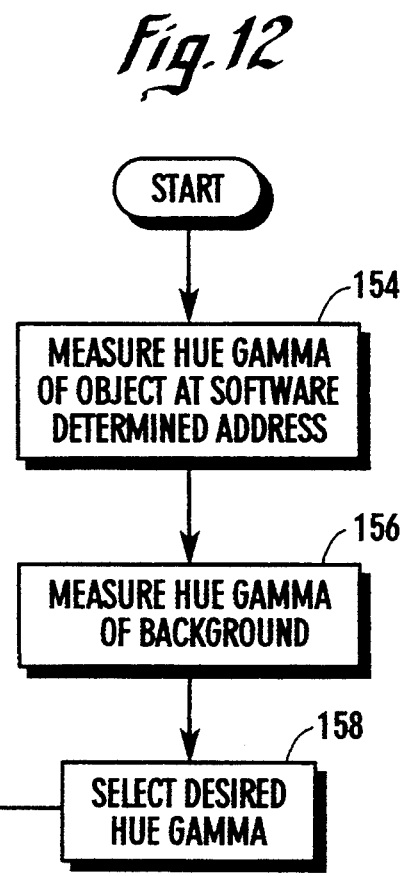
FIG. 12 is a flow diagram of the function for matching the gamma of the object and the gamma of the preselected background of the control flow of FIG. 6.

Starting at block 154 in FIG. 12, the transputer 44 measures the hue gamma of the object 22 (FIG. 2) at a software determined address within the object. The software determined address can be a predetermined portion of the object such as the hand, face or clothing of the person that was imaged, and can be defined in terms of relative coordinates. From block 154, the transputer 44 proceeds to block 156 wherein the transputer 44 measures the hue gamma of the background at a predetermined software determined address.

Next, the transputer 44 proceeds to block 158 wherein the transputer 44 chooses which lighting condition is desired. In other words, the transputer 44 at block 158 determines whether the hue gamma of the object will be changed to match the hue gamma of the background or whether the hue gamma of the background will be changed to match the hue gamma of the object. This determination by the transputer 44 can be accomplished in response to an interactive command by the operator of the system 10, i.e., the operator of the system 10 can decide whether he wishes to change the lighting condition of the background to match the lighting conditions under which he was imaged, or whether he wishes to change the apparent lighting conditions under which he was imaged to match the lighting conditions of the background. Furthermore, the apparent lighting conditions of the object and background can both be changed to match a third lighting condition if desired.

From block 158, the transputer 44 proceeds to decision block 160 wherein the transputer 44 determines whether the object hue is to be changed. If so, the transputer 44 proceeds to block 162 wherein the transputer 44 sets the gamma of the object to equal the background hue gamma. Otherwise, the transputer 44 proceeds to block 164 wherein the transputer 44 sets the gamma of the background object to equal the gamma of the object.

The software described herein, some of which is listed in the attached Microfiche Appendix, was translated from source code to machine-readable object code using the helios language compilers and utilities, as well as an assembler for the ATW 800 transputer Nonetheless, one skilled in the technology will recognize that the steps in the accompanying flow diagrams can be implemented by using a number of different compilers and/or programming languages.

While the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention.

I claim:

1. A system for selectively combining digital images, comprising:
    a processor having a memory for storing a first digital image having a plurality of pixels, wherein the first digital image includes an object bordered by an edge having a first hue, and a background having a second hue which can be any desired color;
    means for locating the edge in the first digital image by comparing the hues of each background pixel with one of the object pixels of a predetermined hue, thereby mapping background pixels in an immediate vicinity of the edge of the first digital image; and
    means for removing the background from the first digital image using the located edge.

2. The system of claim 1, additionally comprising means for combining the object with a second digital image.

3. The system of claim 2, wherein the combining means includes means for averaging the hue of the edge and the hue of the second digital image so as to generate an averaged hue, wherein the averaged hue replaces the edge and thereby produces a blended object.

4. The system of claim 3, wherein at least a portion of the blended object has a first gamma and at least portion of the second digital image has a second gamma, and additionally comprising means for setting one of: the first gamma and the second gamma, to equal the other gamma.

5. The system of claim 1, wherein each hue is characterized by a numeric value.

6. The system of claim 5, wherein the background includes a plurality of two-dimensional boxes, each box having a plurality of dots therein, the processor having an image of the background stored in memory, wherein the means for locating the edge compares the hue of pixel in the first digital image with the hue of a corresponding pixel of a background image stored in the memory, the predetermined hue for each comparison thus being the hue of the corresponding pixel in the background image.

7. The system of claim 5, wherein the means for locating the edge determines the difference between the numeric value of one pixel and the numeric value of a contiguous pixel, and compares the difference to a predetermined difference, the predetermined hue for each comparison thus being the hue of the adjacent pixel.

8. The system of claim 1, wherein the means for removing the background from the first digital image sets all background pixels to a preselected transparent value.

9. The system of claim 1, additionally comprising a video camera connected to the processor, the camera generating a signal which is stored as the first digital image.

10. The system of claim 7, additionally comprising a video monitor connected to the processor for displaying the first digital image.

11. A gamma correlator, comprising:
means for measuring a gamma of each pixel of an object in a first image and for measuring the gamma of each pixel of a background in a second image;
means for shifting the gamma of at least one selected pixel of the object or at least one selected pixel of one of a plurality of stored backgrounds to substantially equal the gamma of the other; and
means for shifting a first gamma of a selected object and a second gamma of a selected background to a third gamma of a lighting environment distinguishable from lighting conditions of the selected object and the selected background.

12. An image combiner, comprising:
a processor for receiving a signal representative of a first digital image, the signal including an object component representative of an object, the object being bordered by an edge having a first hue, the signal also including a background component representative of a background having a second hue, wherein the processor includes means for separating the background from the object by determining the location of the edge of the object and then removing all portions of the first digital image which are outside the edge from all the portions of the first digital image which are inside the edge; and
means for combining a portion of the first digital image with a second digital image, wherein said portion of the first digital image is alternatively (i) reoriented or (ii) reoriented and repositioned onto the second digital image.

13. The image combiner of claim 12, further comprising a video camera for generating the signal, the processor being electrically connected to the video camera for receiving the signal therefrom.

14. The image combiner of claim 13, further comprising a video monitor electrically connected to the processor for displaying the image of the object.

15. The image combiner of claim 12, wherein the first digital image has a periphery, and the processor further comprises:
means for determining the difference between the hue of a portion of the periphery and a predetermined hue;
means for comparing the difference to a predetermined difference;
wherein when the difference exceeds the predetermined difference, the processor identifies the location of the portion of the periphery as the location of a portion of the object, and then compares the hue of other portions of the periphery with the predetermined hue; and
wherein when the difference is less than the predetermined difference, the processor compares the hue of inwardly succeeding portions, relative to the periphery, of the first digital image with the predetermined hue until the difference between a portion and the predetermined hue exceeds the predetermined difference;
until the entire edge of the object has been identified.

16. The image combiner of claim 15, wherein the background includes a plurality of two-dimensional boxes, each box having a plurality of dots therein, the processor having an image of the background stored in memory, the stored image corresponding to the first digital image, wherein the processor compares the hue of at least some of the first video image with the hue of the corresponding portions of the image of the background stored in memory to determine the location of the edge of the object.

17. The image combiner of claim 15, wherein the processor receives a second digital signal representative of a preselected background, and the processor overlays the object onto the preselected background.

18. The image combiner of claim 17, wherein the preselected background has at least one hue, and the processor averages the hue of the object and the hue of the preselected background to generate an averaged signal representative of an averaged hue, the processor changing the hue of the edge of the object to equal the averaged hue, to thereby produce a blended object.

19. The image combiner of claim 18, wherein at least a portion of the blended object has a first gamma and at least a portion of the preselected background has a second gamma, and the processor sets one of the first gamma and the second gamma to equal the other gamma.

20. The image combiner of claim 15, wherein the digital signal comprises a plurality of pixels, each pixel having a hue and each hue having a corresponding numeric value, and the background is a continuous hue, wherein the processor determines the location of the edge of the object by determining the difference between the numeric value of one pixel and the numeric value of an adjacent pixel, and comparing the difference to the predetermined difference.

21. The image combiner of claim 20, wherein the processor removes the background component from the object component by setting all background pixels to a preselected transparent value.

22. The image combiner of claim 15, wherein the background has a single continuous hue, and the predetermined hue is the hue of the background.

23. A method for generating an edited digital image from a first digital image, the first digital image including an object having a first hue and a background having a second hue, the method comprising the steps of:

- detecting in the first image an edge defined by the difference in hue between the object and the background;
- comparing the hues of each background pixel with one of the object pixels of a predetermined hue, thereby mapping background pixels in an immediate vicinity of the edge of the first digital image; and
- selectively removing the background from the first digital image by setting the mapped background pixels to a preselected transparent value so as to only retain substantially the entire object in the first digital image.

24. The method of claim 23 including a second digital image having a third hue, the method further comprising the steps of:

- overlaying the object from the first digital image on the second digital image; and
- averaging the hue of the object and the second digital image along the edge of the object, thereby producing a blended object in the second digital image.

25. The method of claim 24, further comprising the step of setting one of: the first hue in at least a portion of the blended object and the third hue in the second digital image, to equal the other hue.

26. A method of integrating a digital image of an object into a digital image of a background, comprising the steps of:

- measuring the gamma of the object in a first hue;
- measuring the gamma of the background in a second hue; and
- shifting the gamma of a selected one of the object or the background to alternatively (i) substantially equal the gamma of the other or (ii) shift a first gamma of a selected object and a second gamma of a selected background to a third gamma of a lighting environment distinguishable from lighting conditions of the selected object or the selected background.

27. A system for selectively combining digital images, comprising:

- a processor having a memory for storing a first digital image having a plurality of pixels, wherein the first digital image includes an object bordered by an edge having a first hue, and a background having a second hue which can be any desired color;
- means for locating the edge in the first digital image by comparing, for background pixels and some of, but not all, the object pixels, the hues of the pixels with a predetermined hue, wherein each hue is characterized by a numeric value;
- means for removing the background from the first digital image using the located edge; and
- means for combining the object with a second digital image, wherein the combining means includes means for averaging the hue of the edge and the hue of the second digital image so as to generate an averaged hue, wherein the averaged hue replaces the edge and thereby produces a blended object.

28. The system of claim 27, wherein the background includes a plurality of two-dimensional boxes, each box having a plurality of dots therein, the processor having an image of the background stored in memory, wherein the means for locating the edge compares the hue of a pixel in the first digital image with the hue of a corresponding pixel of a background image stored in the memory, the predetermined hue for each comparison thus being the hue of the corresponding pixel in the background image.

29. The system of claim 27, wherein a portion of the object is selectively combined with the second digital image in real-time by an operator, wherein said portion of the object is alternatively (i) reoriented or (ii) reoriented and repositioned onto the second digital image.

30. The system of claim 27, wherein at least a portion of the blended object has a first gamma and at least a portion of the second digital image has a second gamma, and additionally comprising means for setting one of the first gamma and the second gamma to equal the other gamma.

31. An image combiner, comprising:

- a processor for receiving a signal representative of a first digital image, the signal including an object component representative of an object, the object being bordered by an edge having a first hue, the signal also including a background component representative of a background having a second hue, wherein the processor includes means for separating the background from the object by determining the location of the edge of the object and then removing all portions of the first digital image which are outside the edge from all the portions of the first digital image which are inside the edge, wherein the first digital image has a periphery, and the processor further comprises:
- means for determining the difference between the hue of a portion of the periphery and a predetermined hue;
- means for comparing the difference to a predetermined difference;
- wherein when the difference exceeds the predetermined difference, the processor identifies the location of the portion of the periphery as the location of a portion of the object, and then compares the hue of other portions of the periphery with the predetermined hue;
- wherein when the difference is less than the predetermined difference, the processor compares the hue of inwardly succeeding portions, relative to the periphery, of the first digital image with the predetermined hue until the difference between a portion of the first digital image and the predetermined hue exceeds the predetermined difference; and
- wherein the background includes a plurality of two-dimensional boxes, each box having a plurality of dots therein, the processor having an image of the background stored in memory, the stored image corresponding to the first digital image, wherein the processor compares the hue of at least some of the first video image with the hue of the corresponding portions of the image of the background stored in memory to determine the location of the edge of the object, thereby mapping the entire edge of the object.

32. The image combiner of claim 31, wherein the preselected background has at least one hue, and the processor averages the hue of the object and the hue of the preselected background to generate an averaged signal representative of an averaged hue, the processor changing the hue of the edge of the object to equal the averaged hue, to thereby produce a blended object.

33. The image combiner of claim 32, wherein at least a portion of the blended object has a first gamma and at least a portion of the preselected background has a second gamma, and the processor sets one of the first gamma and the second gamma to equal the other gamma.

34. A method for generating an edited digital image from a first digital image, the first digital image including an object having a first hue and a background having a second hue, and further including a second digital image having a third hue, the method comprising the steps of:
  detecting in the first image an edge defined by the difference in hue between the object and the background;
  selectively removing the background from the first digital image so as to retain substantially the entire object in the first digital image;
  overlaying the object from the first digital image on the second digital image; and
  averaging the hue of the object and the second digital image along the edge of the object, thereby producing a blended object in the second digital image.

35. The method of claim 34, further comprising the step of setting one of the first hue in at least a portion of the blended object and the third hue in the second digital image to equal the other hue.

* * * * *

UNITED STATES PATENT AND TRADEMARK OFFICE
CERTIFICATE OF CORRECTION

PATENT NO. : 5,345,313

DATED : September 6, 1994

INVENTOR(S) : Arthur M. Blank

It is certified that error appears in the above-identified patent and that said Letters Patent is hereby corrected as shown below:

On the title page, item [56] References Cited, under U. S. Patent Documents: please add the following references:

| | | |
|---|---|---|
| 4,240,104 | 12/16/80 | Taylor, et al. |
| 4,258,385 | 03/24/81 | Greenberg, et al. |
| 4,357,624 | 11/02/82 | Greenberg |
| 4,409,618 | 10/11/83 | Inaba, et al. |
| 4,463,380 | 07/31/84 | Hooks, Jr. |
| 4,599,611 | 07/08/86 | Bowker, et al. |
| 4,621,280 | 11/04/86 | Shinohara, et al. |
| 4,677,460 | 06/30/87 | Fass, et al. |
| 4,698,682 | 10/06/87 | Astle |

UNITED STATES PATENT AND TRADEMARK OFFICE
CERTIFICATE OF CORRECTION

PATENT NO.  : 5,345,313

DATED       : September 6, 1994

INVENTOR(S) : Arthur M. Blank

It is certified that error appears in the above-identified patent and that said Letters Patent is hereby corrected as shown below:

Col. 5, line 17, replace "Figure 5 is" with --Figures 5A, 5B, 5C, 5D, and 5E are--.
Column 5, lines 17-18, delete ", labeled I, II, III IV and V,".
Column 5, line 24, replace "Figure 7a-7d" with --Figures 7A, 7B, 7C, and 7D comprise--.
Col. 6, line 60, delete "at Roman numeral I", and replace "5" with --5A--.
Col. 6, line 64, delete "Roman numeral I of", and replace "5" with --5A--.
Col. 6, line 68, delete "in Roman numeral II", and replace "5" with --5B--.
Col. 7, line 27, delete "at Roman numeral III", and replace "5" with --5C--.
Col. 8, line 49, replace "5" with --5C--, and delete "Roman numeral III".
Col. 9, line 2, delete "at Roman numeral IV", and replace "5" with --5D--.
Col. 9, line 30, delete "Roman numeral IV of", and replace "5" with --5D--.
Col. 9, lines 37-38, delete "in the diagram labelled Roman numeral V".
Col. 9, line 38, replace "5" with --5E--.
Col. 9, line 62, delete "at Roman numeral V", and replace "5" with --5E--.
Col. 9, line 68, replace "and 7" with --7A, 7B, 7C, and 7D--.
Col. 10, line 1, replace "and 7" with --7A, 7B, 7C, and 7D--.

UNITED STATES PATENT AND TRADEMARK OFFICE
CERTIFICATE OF CORRECTION

PATENT NO.  : 5,345,313

DATED       : September 6, 1994

INVENTOR(S) : Arthur M. Blank

It is certified that error appears in the above-identified patent and that said Letters Patent is hereby corrected as shown below:

Col. 10, line 10, after "image", insert --(Figure 7B)--.
Col. 10, line 14, delete "at Roman numeral I", and replace "7" with --7A--.
Col. 11, line 54, delete "Roman numeral III of", and replace "7" with --7C--.
Col. 12, lines 55-58, delete "After the remaining background has been removed, the image 54 appears as shown in the diagram designated by Roman numeral III in Figure 7.--.
Col. 13, lines 17-18, delete "at Roman numeral IV", and replace "7" with --7D--.

Signed and Sealed this

Fifth Day of December, 1995

BRUCE LEHMAN

*Commissioner of Patents and Trademarks*

*Attest:*

*Attesting Officer*